(12) United States Patent
Lee

(10) Patent No.: US 6,381,629 B1
(45) Date of Patent: Apr. 30, 2002

(54) TECHNIQUE FOR CREATING A UNIQUE ITEM IDENTIFICATION NUMBER IN A MULTI-THREADED/MULTI-PROCESS ENVIRONMENT

(75) Inventor: Thomas S. Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,107

(22) Filed: Aug. 30, 1999

(51) Int. Cl.[7] ............................................. G06F 17/30
(52) U.S. Cl. .................................. 709/201; 707/10
(58) Field of Search ............................. 707/1, 2, 6, 7, 707/8, 103 R, 103 Y, 4, 9, 10; 709/201, 223, 224, 225, 226

(56) References Cited

U.S. PATENT DOCUMENTS

| | | | |
|---|---|---|---|
| 4,748,668 A | 5/1988 | Shamir et al. | 380/30 |
| 5,117,351 A | 5/1992 | Miller | 707/10 |
| 5,251,165 A * | 10/1993 | James, III | 708/250 |
| 5,832,487 A * | 11/1998 | Olds et al. | 707/10 |
| 5,999,928 A * | 12/1999 | Yan | 707/6 |
| 6,269,366 B1 * | 7/2001 | Romano et al. | 707/6 |

* cited by examiner

*Primary Examiner*—Jack M. Choules
*Assistant Examiner*—Cheryl Lewil

(57) ABSTRACT

A method, apparatus, and article of manufacture for generating an item identification number within a computer. An item identification number is associated with an item stored in a database connected to the computer. In accordance with the present invention, a unique seed value is created, wherein the unique seed value comprises a computer-dependent timestamp and one or more unique identifiers. A unique item identification number is produced by inputting the unique seed value into a random number generator.

36 Claims, 3 Drawing Sheets

TECHNIQUE FOR CREATING A UNIQUE ITEM IDENTIFICATION NUMBER IN A MULTI-THREADED/MULTI-PROCESS ENVIRONMENT

BACKGROUND OF THE INVENTION

1. Field of the Invention

This invention relates in general to computer-implemented database management systems, and, in particular, to a technique for creating a unique item identification number.

2. Description of Related Art

The Internet is a collection of computer networks that exchange information via Transmission Control Protocol/Internet Protocol ("TCP/IP"). The Internet computer network consists of many Internet networks, each of which is a single network that uses the TCP/IP protocol suite. Currently, the use of the Internet computer network for commercial and noncommercial uses is exploding. Via its networks, the Internet computer network enables many users in different locations to access information stored in data sources (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a Database Management System ("DBMS"), which is connected to the data sources. These computer programs residing at the Web server computer will retrieve the data and transmit the data to the client computer. The data can be any type of information, including database data, static data, HTML data, or dynamically generated data.

With the fast growing popularity of the Internet and the World Wide Web (also known as "WWW" or the "Web"), there is also a fast growing demand for Web access to databases. In particular, databases on the Web are often used to store items, such as images, text files, and audio files. After the items are stored, users may attempt to access the items from the databases. To prevent conflicts between users that desire to access an item, each item has an identification number.

In conventional database systems, the identification number is generated by using a random number generator. Input into the random number generator, referred to as a "seed" value, is typically a computer-dependent timestamp value. The computer-dependent timestamp value is related to a time-of-day ("TOD") clock value. In most computers, the TOD clock is incremented once every one hundredth of a second. The seed value is input into a random number generator, and the random number generator outputs a random number. This random number is used to create the item identification number.

The item identification number is created by mapping the random number into a character string. A user or software developer can define the length of the character string. To increase the length of the character string, a user can invoke the random number generator multiple times and append the consecutive random numbers together. These appended random numbers are mapped into a character string. The user may continue to invoke the random number generator until a desired character string length is achieved.

Although the random number generator produces a random number, it may not be unique because a single seed value will always produce the same random number (or the same sequence of random numbers when the random number generator is invoked multiple times). To clarify, when a particular seed value is input into a random number generator, the random number generator outputs a random number that is associated with that particular seed value. For example, suppose a seed value of 113601 is input into a random number generator, and suppose the random number generator outputs a random number value of 472. The random number generator will always produce a random number value of 472 when the seed value of 113601 is entered. Consequently, when multiple items are produced at the exact same instant in time, such that each item has the exact same timestamp, then, the random number generator uses the same timestamp to generate item identification numbers, and hence, generates non-unique item identification numbers. The random numbers are non-unique because the same timestamp value was used as the seed. Since the random number is used to create the identification number, the identification number is also non-unique.

Several scenarios may produce a single timestamp for multiple items. For instance, multiple users may create an item to store in a database at the same instant in time. The random number generator will use a single timestamp value to create the random number. Accordingly, each item may have the exact same identification number.

Similar outcomes may be produced when multiple processes (also referred to as tasks) are executed at the same instant in time. For the examples used, a process is an executing software program, but one skilled in the art may recognize other definitions for processes. Like the items created by multiple users, the items created by multiple processes may each have the exact same identification number. Comparable results may occur when multiple threads are executed at the same instant in time. As used in the following examples, a thread is a part of a software program that can be executed independently of other parts of the software program. Like the items created by multiple users and the items created by multiple processes, the items created by multiple threads may each have the exact same identification number.

When multiple items that have the same identification number exist in a database, the system can fail because the system may be incapable of distinguishing between the multiple items. That is, the system may lack the ability to identify a correct item to return in response to a request for an item with a particular item identification number.

Thus, there is a need in the art for generating unique item identification numbers, and hence, reducing the number of system failures.

SUMMARY OF THE INVENTION

To overcome the limitations in the prior art described above, and to overcome other limitations that will become apparent upon reading and understanding the present specification, the present invention discloses a method, apparatus, and article of manufacture for generating an item identification number within a computer. An item identification number is associated with an item stored in a database connected to a computer.

In accordance with the present invention, a unique seed value is created, wherein the unique seed value comprises a computer-dependent timestamp and one or more unique identifiers. A unique item identification number is produced by inputting the unique seed value into a random number generator.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
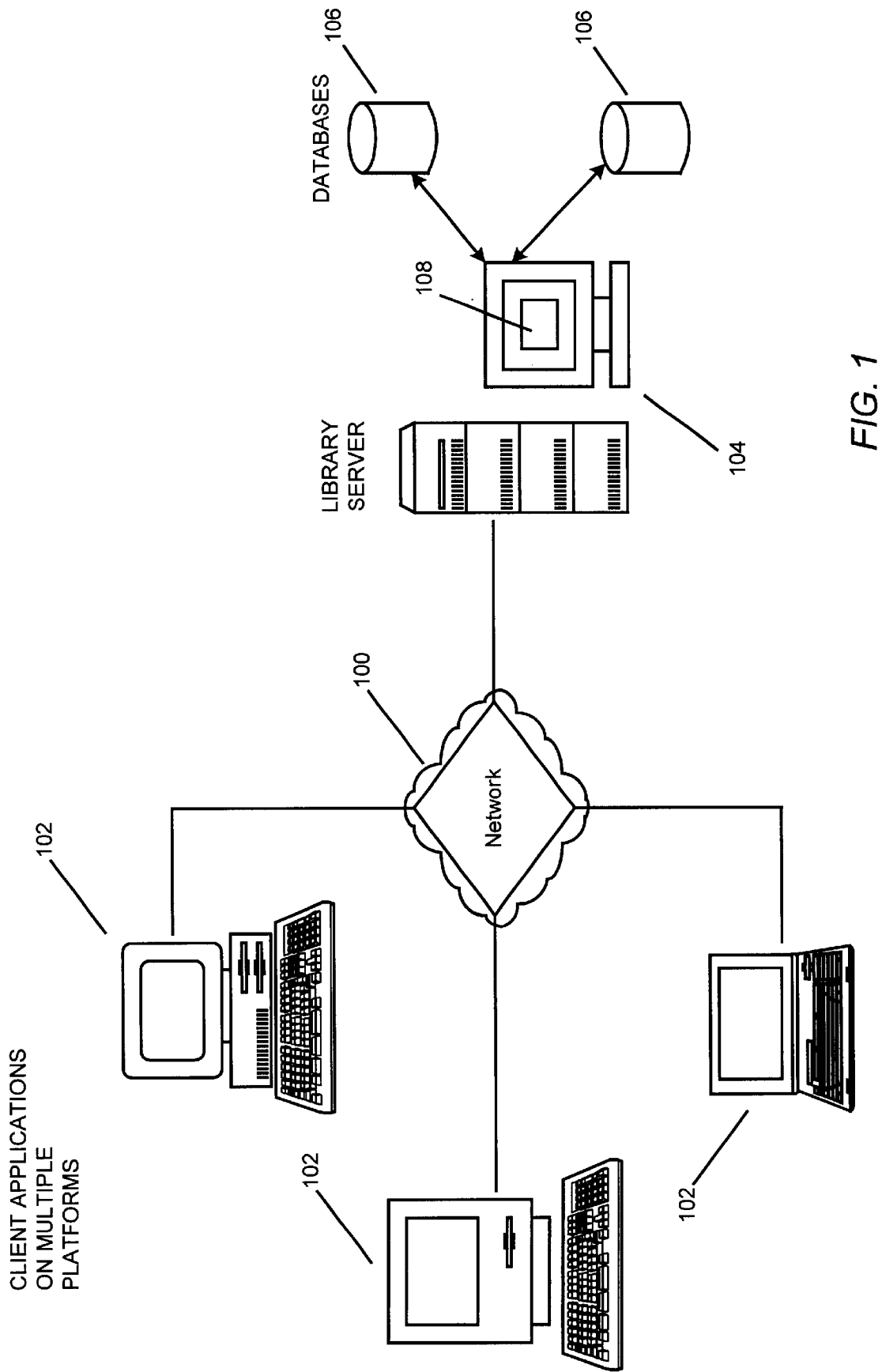
FIG. 1 schematically illustrates a hardware environment of a preferred embodiment of the present invention, and more particularly, illustrates a typical distributed computer system.

FIG. 1 schematically illustrates the hardware environment of a preferred embodiment of the present invention, and more particularly, illustrates a typical distributed computer system using the network 100 to connect client computers 102 executing client applications to a library server computer 104 executing software and other computer programs, and to connect the server system 104 to data sources 106. A data source 106 may comprise, for example, a multi-media database. A typical combination of resources may include client computers 102 that are personal computers or workstations, and a library server computer 104 that is a personal computer, workstation, minicomputer, or mainframe. These systems are coupled to one another by various networks, including LANs, WANs, SNA networks, and the Internet.

A client computer 102 typically executes a client application and is coupled to a library server computer 104 executing server software, such as the IBM Digital Library or the Image PlusVisual Info product, both manufactured by International Business Machines, Corp. in Armonk, N.Y. The library server computer 104 also uses a data source interface and, possibly, other computer programs, for connecting to the data sources 106. The client computer 102 is bi-directionally coupled with the library server computer 104 over a line or via a wireless system. In turn, the library server computer 104 is bi-directionally coupled with data sources 106.

The data source interface may be connected to a Database Management System (DBMS), which supports access to a data source 106 by executing RDBMS software. The interface and DBMS may be located on the same server as the library server computer 104 or may be located on a separate machine. The data sources 106 may be geographically distributed.

The DBMS contains several modules, including, but not limited to, an item identification system 108. The item identification system 108 works in conjunction with an operating system (not shown) to provide unique item identification numbers for each item stored in the data source 106. Under control of the operating system, the RDBMS software, and the instructions derived therefrom, may be loaded from the data storage devices 108 into a memory of the computer system 100 for use during actual operations.

Those skilled in the art will recognize many modifications may be made to this configuration without departing from the scope of the present invention.

Generating a Unique Item Identification Number

The disclosed embodiment of the present invention provides an item identification system 108 for generating unique item identification numbers. Item identification numbers are character strings that represent unique identifiers for each item stored in a database, an item may be for example an image file or an audio data file. The item identification system 108 generates unique item identification numbers by using a random number generator. For the random number generator, a computer-dependent timestamp value and unique computer-dependent information are used as a seed value. Namely, the item identification system 108 sums a computer-dependent timestamp value and unique computer-dependent information. This summed value is used as the seed value for a random number generator. Using this seed value, the random number generator produces a random numeric value.

The item identification system 1089 maps this random numeric value into a character string. The length of the character string is determined by the user or software developer. To increase the length of the character string, the item identification system 108 invokes the random number generator multiple times and appends the consecutive random numbers together. These appended random numbers are then mapped into a character string. The item identification system 108 continues to invoke the random number generator until a desired character string length is achieved.

Figure 2:
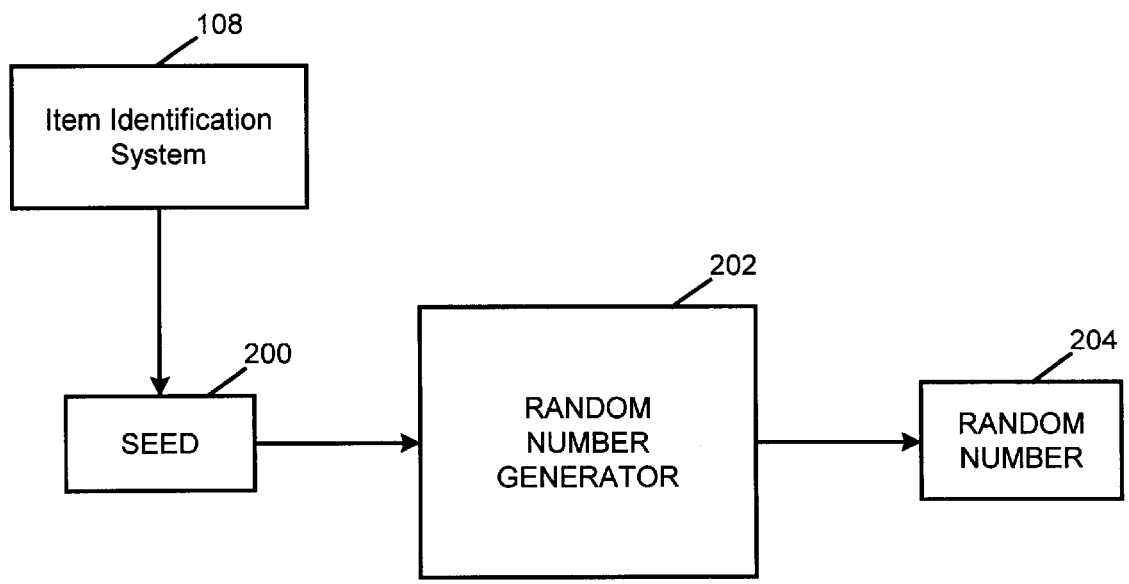
FIG. 2 is a block diagram that illustrates a random number generator as used with an embodiment of the present invention.

FIG. 2 illustrates a block diagram of a random number generator 202. The random number generator 202 is similar to a black box that receives an input and produces an output, without revealing the technique for producing the output. Indeed, any conventional technique can be implemented within the random number generator 202, without exceeding the scope of the present invention. Here, the seed value 200 is the input and the random number value is the output 204. The seed value 200 is produced by the item identification system 108.

Conventional systems tend to use the timestamp value as a seed. Using only the timestamp as a seed, without other unique identifiers, creates a high probability of producing non-unique random numbers, and hence non-unique item identification numbers. In conventional systems, a single timestamp is used for multiple seeds in the following scenarios: when multiple users create an item to be stored in a database at the same instant in time; when multiple processes are executed to create an item at the same instant in time; and when multiple threads are executed to create an item at the same instant in time.

In contrast, the item identification system 108 uses the timestamp along with unique computer-dependent information. This additional information increases the probability of generating unique random numbers because unique seeds are input into the random number generator. Thus, unlike conventional systems, the item identification system 108, never uses a single value (e.g., a single timestamp value) as multiple seeds to generate multiple item identification numbers. Accordingly, the item identification 108 system produces unique item identification numbers for the scenarios described above.

In an embodiment of the present invention, the timestamp value is related to the time-of-day ("TOD") clock value. The TOD clock value is a binary counter, and the TOD clock value has a format that corresponds to the bit positions of a sixty-four bit unsigned binary integer. The resolution of the TOD clock value varies with the speed of a particular processor. In a preferred embodiment of the present invention, it is assumed that all recent processors have resolutions to at least one one-hundredth of a second. It is to be understood that as processor speeds increase, this resolution may improve without departing from the scope of the present invention.

The unique computer-dependent information includes, but is not limited to, a workstation identification number, a process identification number, a thread identification number, and a global variable. Each workstation in a distributed network of computers has a unique identification number that distinguishes the workstation from other workstations in the network. A process is an executing software program, and a process identification number distinguishes one process from other processes. A thread is a part of a software program, and the thread can be executed independently of other parts of the software program. The thread identification number distinguishes one thread from other threads. The global variable is related to the number of times in which a thread creates an item.

The workstation, the process, and the thread, are capable of producing items that are stored in a database. For example, items are generated at a particular workstation, and both processes and threads are used to create items. Their respective item identification numbers serve two purposes. First, the item identification numbers serve to uniquely identify an item. Second, the item identification numbers assist in determining the source of an item. This source information may assist system administrators in resolving conflicts between items.

In a preferred embodiment of the present invention, each process has a process identification number and an associated global variable. The global variable is related to the number of times in which a thread, contained within the process, produces an item. More specifically, the global variable relates to the number of times in which the item identification system 108 invokes the random number generator to create an item identification number for an item produced by the thread. Each time the item identification system 108 invokes the random number generator, the item identification system 108 increments the global variable by one point. The one point represents that the random number generator has been invoked one time.

When the item identification system 108 starts up, the item identification system 108 initializes the global variable to zero. The item identification system 108 increments the global variable until the global variable reaches its maximum length. In a preferred embodiment of the present invention, the maximum length is four bytes. When the global variable satisfies a pre-defined criteria such as, reaching a maximum length, its value is reset to zero. Due to the four byte maximum length, the item identification system 108 may proceed for months, or maybe even years, without resetting the global variable. Indeed, those skilled in the art will recognize that other lengths may be used without exceeding the scope of the present invention. In an alternative embodiment of the present invention, the pre-defined criteria is satisfied when a process terminates its execution.

Figure 3:
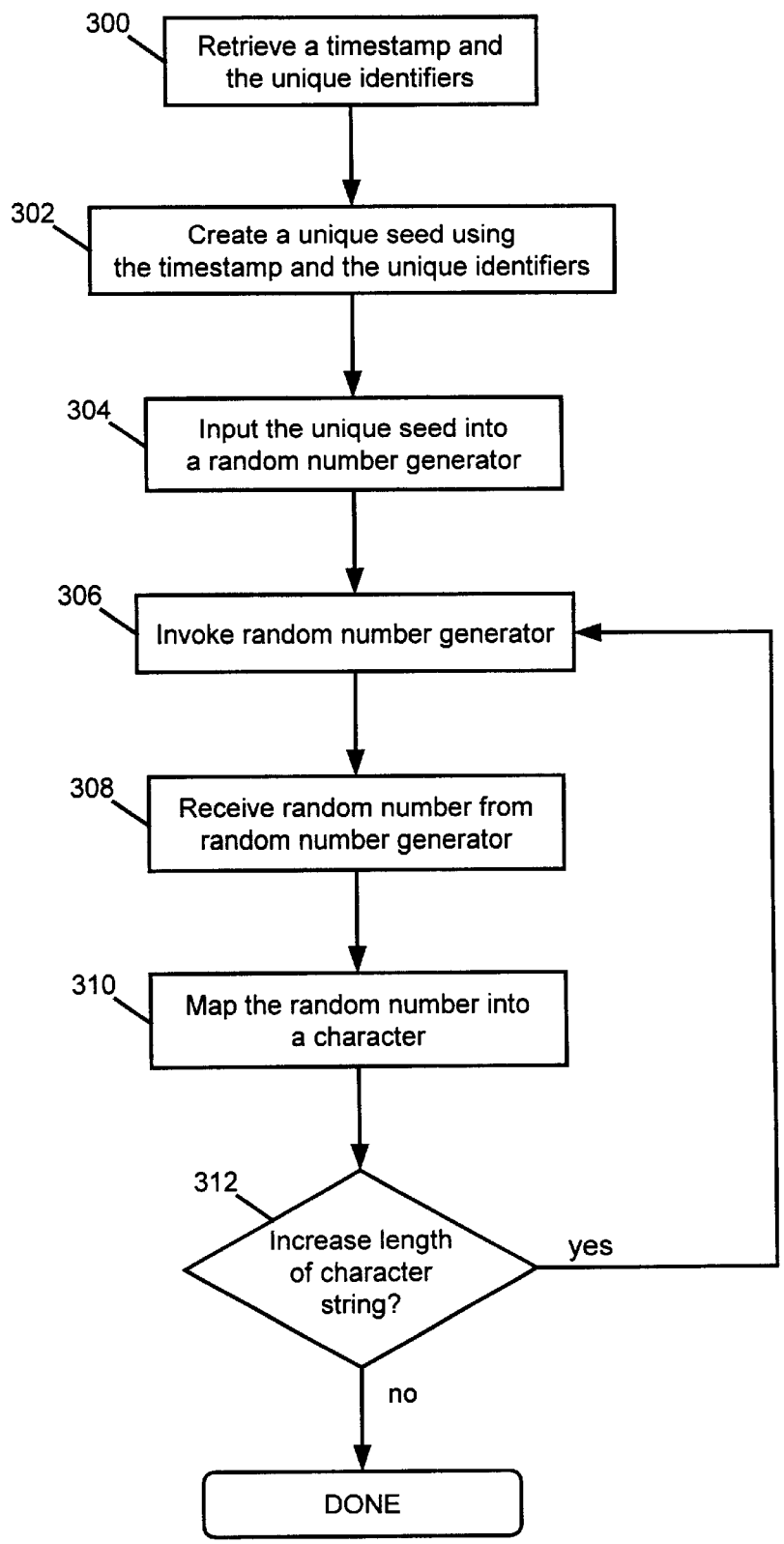
FIG. 3 is a flow chart that illustrates the steps performed in accordance with an embodiment of the present invention.

FIG. 3 is a flow chart that illustrates the steps performed in accordance with an embodiment of the present invention. Block 300 represents the item identification system 300 retrieving a timestamp and the unique computer dependent identifiers. A unique seed is created using the timestamp and the unique computer-dependent identifiers, as represented by block 302. Specifically, the item identification system 108 sums the timestamp and the unique identifiers. The summed value is the seed. Next, the item identification system 108 inputs the seed into the random number generator, as represented by block 304. Block 306 represents the item identification system 108 invoking the random number generator. The item identification system 108 then receives a random number from the random number generator as represented by block 308. Block 310 represents the item identification system 108 mapping the random number into a character.

Block 312 is decision block that represents the item identification system 108 determining whether to increase the length of a character string. If so, the item identification system 108 returns to block 306. Otherwise, the item identification system 108 terminates its processing.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of generating an item identification number within a computer, the item identification number being associated with an item being stored in a database connected to the computer, the method comprising the steps of:

creating a unique seed value, wherein the unique seed value comprises a computer-dependent timestamp and one or more unique identifiers; and producing a unique item identification number by inputting the unique seed value into a random number generator.

2. The method of claim 1, wherein the method further comprises the step of mapping the unique item identification number into a character string.

3. The method of claim 1, wherein creating further comprises summing the computer-dependent timestamp with the unique identifiers.

4. The method of claim 1, wherein the unique identifier is a workstation identification number.

5. The method of claim 1, wherein the unique identifier is a process identification number.

6. The method of claim 1, wherein the unique identifier is a thread identification number.

7. The method of claim 1, wherein the unique identifier is a global variable, and wherein the global variable is a numeric value that is incremented by one when the random number generator is invoked.

8. The method of claim 7, wherein the method further comprises the step of setting the global variable to zero when the global variable satisfies a pre-defined criteria.

9. The method of claim 1, wherein the computer is connected to two or more workstations, and wherein a first workstation produces a first item at a particular time, and wherein a second workstation produces a second item at the particular time, and wherein the step of producing further comprises producing a unique item identification number for each item.

10. The method of claim 1, wherein two or more threads are executed, and wherein a first thread produces a first item at a particular time, and wherein a second thread produces a second item at the particular time, and wherein the step of producing further comprises producing a unique item identification number for each item.

11. The method of claim 1, wherein two or more processes are executed, and wherein a first process produces a first item at a particular time, and wherein a second process produces a second item at the particular time, and wherein the step of producing further comprises producing a unique item identification number for each item.

12. The method of claim 1, wherein each unique identifier is associated with a source of the item.

13. An apparatus for generating an item identification number within a computer, the item identification number being associated with an item, comprising:

a computer having a database connected thereto, wherein the database stores the item;

one or more computer programs, performed by the computer, for creating a unique seed value, wherein the unique seed value comprises a computer-dependent timestamp and one or more unique identifiers, and producing a unique item identification number by inputting the unique seed value into a random number generator.

14. The apparatus of claim 13, wherein the apparatus further comprises one or more computer programs, performed by the computer, for mapping the unique item identification number into a character string.

15. The apparatus of claim 13, wherein creating further comprises summing the computer-dependent timestamp with the unique identifiers.

16. The apparatus of claim 13, wherein the unique identifier is a workstation identification number.

17. The apparatus of claim 13, wherein the unique identifier is a process identification number.

18. The apparatus of claim 13, wherein the unique identifier is a thread identification number.

19. The apparatus of claim 13, wherein the unique identifier is a global variable, and wherein the global variable is a numeric value that is incremented by one when the random number generator is invoked.

20. The apparatus of claim 19, wherein the apparatus further comprises one or more computer programs for setting the global variable to zero when the global variable satisfies a pre-defined criteria.

21. The apparatus of claim 13, wherein the computer is connected to two or more workstations, and wherein a first workstation produces a first item at a particular time, and wherein a second workstation produces a second item at the particular time, and wherein the step of producing further comprises producing a unique item identification number for each item.

22. The apparatus of claim 13, wherein two or more threads are executed, and wherein a first thread produces a first item at a particular time, and wherein a second thread produces a second item at the particular time, and wherein the step of producing further comprises producing a unique item identification number for each item.

23. The apparatus of claim 13, wherein two or more processes are executed, and wherein a first process produces a first item at a particular time, and wherein a second process produces a second item at the particular time, and wherein the step of producing further comprises producing a unique item identification number for each item.

24. The apparatus of claim 13, wherein each unique identifier is associated with a source of the item.

25. An article of manufacture comprising a computer program carrier readable by a computer and embodying one or more instructions executable by the computer to perform method steps for generating an item identification number within a computer, the item identification number being associated with an item being stored in a database connected to the computer, the method comprising the steps of:

creating a unique seed value, wherein the unique seed value comprises a computer-dependent timestamp and one or more unique identifiers; and producing a unique item identification number by inputting the unique seed value into a random number generator.

26. The article of manufacture of claim 25, wherein the method further comprises the step of mapping the unique item identification number into a character string.

27. The article of manufacture of claim 25, wherein creating further comprises summing the computer-dependent timestamp with the unique identifiers.

28. The article of manufacture of claim 25, wherein the unique identifier is a workstation identification number.

29. The article of manufacture of claim 25, wherein the unique identifier is a process identification number.

30. The article of manufacture of claim 25, wherein the unique identifier is a thread identification number.

31. The article of manufacture of claim 25, wherein the unique identifier is a global variable, and wherein the global variable is a numeric value that is incremented by one when the random number generator is invoked.

32. The article of manufacture of claim 31, wherein the method further comprises the step of setting the global variable to zero when the global variable satisfies a pre-defined criteria.

33. The article of manufacture of claim 25, wherein the computer is connected to two or more workstations, and wherein a first workstation produces a first item at a particular time, and wherein a second workstation produces a second item at the particular time, and wherein the step of producing further comprises producing a unique item identification number for each item.

34. The article of manufacture of claim 25, wherein two or more threads are executed, and wherein a first thread produces a first item at a particular time, and wherein a second thread produces a second item at the particular time, and wherein the step of producing further comprises producing a unique item identification number for each item.

35. The article of manufacture of claim 25, wherein two or more processes are executed, and wherein a first process produces a first item at a particular time, and wherein a second process produces a second item at the particular time, and wherein the step of producing further comprises producing a unique item identification number for each item.

36. The article of manufacture of claim 25, wherein each unique identifier is associated with a source of the item.

* * * * *